United States Patent
Boll

(10) Patent No.: US 6,250,276 B1
(45) Date of Patent: Jun. 26, 2001

(54) DRIVE MECHANISM FOR ACCESSORY AND ASSEMBLIES OF A RECIPROCATING INTERNAL COMBUSTION ENGINE

(75) Inventor: Wolf Boll, Weinstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/314,379

(22) Filed: May 19, 1999

(30) Foreign Application Priority Data

May 19, 1998 (DE) .............................. 198 22 426

(51) Int. Cl.[7] .................................. F16H 59/14
(52) U.S. Cl. ...................................... 123/198 R
(58) Field of Search .................. 123/198 R; 425/317, 425/318, 320, 346, 347

(56) References Cited

U.S. PATENT DOCUMENTS

| 3,469,473 | | 9/1969 | Förster et al. | |
|---|---|---|---|---|
| 4,569,252 | * | 2/1986 | Harper | 74/785 |
| 4,760,757 | * | 8/1988 | Svab | 74/689 |
| 4,854,192 | * | 8/1989 | Churchill et al. | 74/785 |
| 4,862,770 | * | 9/1989 | Smith | 74/789 |
| 4,870,875 | * | 10/1989 | Morishita | 74/785 |
| 5,263,906 | * | 11/1993 | Antonov | 475/257 |
| 5,372,106 | * | 12/1994 | Botterill | 123/198 R |
| 5,470,285 | * | 11/1995 | Schneider et al. | 475/206 |
| 5,800,298 | * | 9/1998 | Kanehara et al. | 474/8 |

FOREIGN PATENT DOCUMENTS

| 1526560 | 4/1970 | (DE) . |
|---|---|---|
| 2 644 866 | 9/1990 | (FR) . |
| 630788 | 10/1949 | (GB) . |
| 10288044 | 10/1998 | (JP) . |

* cited by examiner

*Primary Examiner*—Marguerite McMahon
*Assistant Examiner*—Jason Benton
(74) *Attorney, Agent, or Firm*—Kenyon & Kenyon

(57) ABSTRACT

A drive mechanism for accessory assemblies of a reciprocating internal combustion engine having a switchable planetary transmission which is positioned concentrically to the crankshaft and is driven by the latter. To prevent the noise- and wear-producing vibrations of the free end of the crankshaft from reaching the planetary transmission, a vibration isolator which functions as a cross-recess coupling is provided between the crankshaft and the planetary transmission.

15 Claims, 2 Drawing Sheets

DRIVE MECHANISM FOR ACCESSORY AND ASSEMBLIES OF A RECIPROCATING INTERNAL COMBUSTION ENGINE

FIELD OF THE INVENTION

The present invention relates to a drive mechanism for accessory assemblies of a reciprocating internal combustion engine.

BACKGROUND INFORMATION

French Unexamined Patent Application No. 2 644 866 discloses a drive mechanism for accessory assemblies of a reciprocating internal combustion engine having a switchable planetary transmission. The planetary transmission is positioned concentrically to the crankshaft and includes a planetary gear carrier attached to the crankshaft, planet gears, a ring gear that can be locked against an end shield using a braking device and a sun gear that is connected to a belt pulley. The sun gear is positioned in the end shield and can be connected to the planetary gear carrier via a one-way clutch.

Switchable planetary transmissions of this type are intended to provide adequate power to accessory assemblies, such as an air conditioner compressor and electric generator, at engine idling speeds without causing those assemblies to race at high engine speeds, which may cause damage. This makes it possible to guarantee the operation of the vehicle electrical system even if the accessory assembly size might be reduced. This is so even if an electrically heated windshield and an electrically heated (pre)-catalytic converter are needed in addition to the equipment now present. The latter is an important prerequisite in reducing pollutant emissions during a cold start.

However, the switchable planetary transmission described in French Unexamined Patent Application 2 644 866 has a large volume and poor efficiency, since it is difficult to lubricate. Because it is connected rigidly to the free end of the crankshaft, this planetary transmission is subjected to the latter's vibratory load, making it susceptible to failures and producing noise emissions.

A switchable planetary transmission whose drive provides damping of the torsional vibrations stemming from the crankshaft is known from German Patent Application No. 1 526 560. This damping is achieved by a combination of compression springs and rubber cushions that are arranged in the planetary gear carrier. However, this has no effect on radial or axial vibrations of the crankshaft end, but only on its tangential vibrations which, unlike radial and axial vibrations, can be corrected by torsional vibration isolators and vibration dampers.

SUMMARY OF THE INVENTION

An object of the present invention is to provide a switchable planetary transmission which is reliable, compact, and quiet and has a high level of efficiency and a long service life.

The present invention provides a drive mechanism for accessory assemblies of a reciprocating internal combustion engine comprising a switchable planetary transmission (1) which is positioned concentrically to the crankshaft (2) and which has a planetary gear carrier (12) connected to the crankshaft (2) with planet gears (15), as well as a ring gear (17) that can be locked against an end shield (19) by a braking device and a sun gear (16) that is connected to a belt pulley (21). The sun gear is positioned in the end shield (19) and can be connected to the planetary gear carrier (12) via a one-way clutch (22). The present invention is characterized in that the planetary gear carrier (12) is connected to the crankshaft (2) by a vibration isolator (8).

To prevent the vibrations produced by the crankshaft end from being transmitted to the planetary transmission, a vibration isolator is connected between the units. The vibration isolator is connected to the crankshaft end and the planetary gear carrier, but does not allow passage of the vibrations produced by the crankshaft end, due to its elasticity or its geometry.

Isolating the vibrations produced by the crankshaft end makes it possible to design a much more light-weight and thus more compact planetary transmission. This also reduces its susceptibility to failures and its noise emissions, in particular the belt pulley noise emissions.

In principle, it is conceivable to connect the crankshaft and planetary gear carrier to the vibration isolator by screwing, riveting, or gluing, etc. An especially simple mounting method, however, is to provide both parts with axial claws which need only to be inserted into corresponding slots in the vibration isolator. An identical number of claws produces a more symmetrical, and thus smaller, load and allows the vibration isolator to be centered before it is mounted. The number of claws is not specified. Two or three per part are usual.

If the vibration isolator is made of an elastic material (such as polyurethane), it is capable of filtering out tangential and axial vibrations as well as radial vibrations.

The tangential vibrations produced by the crankshaft end can be eliminated on the latter by torsional vibration isolators or vibration dampers. It is therefore also possible to use vibration isolators made of an inelastic material. Although their torsional rigidity prevents them from filtering out torsional vibrations, the radial and axial clearance of the claws allows the latter to move radially and axially within the slots, thus eliminating radial and axial vibrations.

Similarly, the vibration isolator can also be designed in the shape of a square or hexagon, with the claws being tangential to its circumferential sides. A vibration isolator known as a cross-recess coupling is characterized by an especially simple design, since it has only four radial slots distributed evenly across its circumference, each accepting two claws.

According to one preferred embodiment of the present invention, the ring gear is mounted on the planet gears so that it can move in an axial direction, and the brake disc is integrally molded onto the ring gear. The one-piece design of the ring gear and brake disk, the floating attachment of the ring gear onto the planet gears, and the ability of corresponding brake pads to move within a retaining ring with an integrated axial stop give the brake a simple design.

A cylindrical piston actuated by oil pressure ensures that the brake pads apply a uniform pressure on the brake disk, thus allowing the latter to operate with little wear and tear. Positioning the cylindrical piston between an outer and an inner guide ring also allows the latter to be operated with little wear and tear and offers freedom in selecting the material for the end shield. The linear contact between a rounded torus of the cylindrical piston and the brake pad facing it avoids twisting and thus wear and tear.

An electronic controller inhibits switching pressure or a variation in engine speed when the planetary transmission is switched on and off.

Because it is placed in the timing box, the planetary transmission is reliably lubricated with motor oil, thereby achieving a high level of efficiency and reducing wear and tear. This solves one problem that could never be controlled by positioning the planetary transmission on the free crankshaft end outside the engine housing. In addition, arranging the planetary transmission in this manner requires only one dynamic gear oil sealing ring, just like in a standard engine. This ring does not have to provide a seal against differential oil pressure, but must merely withstand the vacuum in the crankcase.

BRIEF DESCRIPTION OF THE DRAWINGS

One embodiment of the present invention is explained in greater detail in the description below on the basis of the drawings, in which.

DETAILED DESCRIPTION

Figure 1:
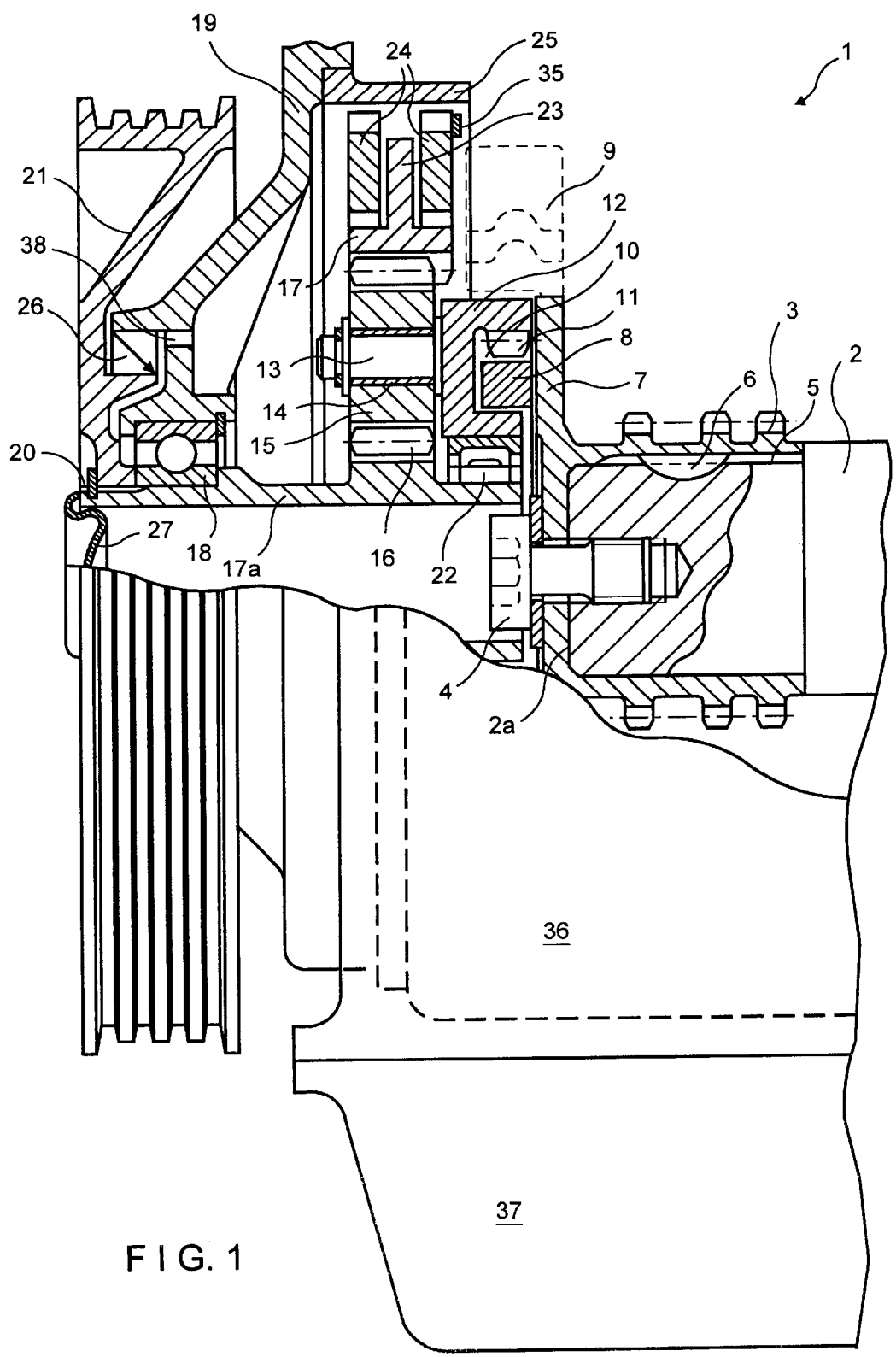
FIG. 1 shows a cross section of a switchable planetary transmission with a parking or setting brake for a ring gear.

FIG. 1 shows a planetary transmission 1 which is positioned coaxially to a crankshaft 2 and is driven by the latter. It is driven by a sprocket wheel combination 3, which is screwed against free end 2a of crankshaft 2 by an anti-torque socket-head screw 4. Sprocket wheel combination 3 is also used to drive the gas exchange control mechanism of the engine and is therefore arranged conformally to crankshaft 2 with spring groove 5 and spring 6.

A flange 7 of sprocket wheel combination 3, located at free crankshaft end 2a, has facing claws 11 perpendicular to plane 2 of the drawing which each fit with a limited amount of tangential clearance and a greater amount of radial clearance into a slot 10 on the circumference of a ring-shaped vibration isolator 8. If necessary, a vibration damper 9 can also be mounted on flange 7 and used to dampen the torsional vibration resonance of crankshaft 2.

On its lateral surface, vibration isolator 8 has two additional facing slots 10 on the plane of the drawing into which two corresponding claws 11 of a planetary gear carrier 12 fit with a limited amount of tangential clearance and a greater amount of radial clearance. Mounted on the side of planetary gear carrier 12 facing away from crankshaft 2 are at least three evenly distributed bolts or axles 13 on which planet gears 15 are mounted in bearing bushes 14. Planet gears 15 engage with an inner sun gear 16 and an outer ring gear 17.

Sun gear 16 is an integral component of a sleeve 17a, with a ball bearing 18 mounted in an end shield or housing part 19 being positioned at its end farthest away from the crankshaft. An end shield 19 closes an opening in a timing box 36 which surrounds planetary transmission 1 and whose lower end is closed by an oil pan 37. Upstream from ball bearing 18, a fine-toothed gearing 20 is provided on the circumference of sleeve 17a for attaching a belt pulley 21 so that it transmits torque. The accessory assemblies are driven by this belt pulley. A one-way clutch 22, which is used to couple planetary gear carrier 12 with sleeve 1 7a, is provided in the area of sleeve 17a close to the crankshaft.

A radial-lip-type oil seal 26 is provided between end shield 19 and belt pulley 21. To relieve the latter of all oil pressure, oil holes 38 are provided around its circumference in end shield 19.

Ring gear 17 is mounted on planet gears 15 in a floating and thus self-centering manner. Ring gear 17 has an integrated brake disk 23, designed like a radial flange, on its outer circumference. A mounting device or retaining ring 25 for brake pads 24 provided on both sides of brake disk 23 is located on end shield 19, with an axial stop 35 being assigned to one of brake pads 24. The end face of sleeve 17a is closed by a plastic cover 27.

Figure 2:
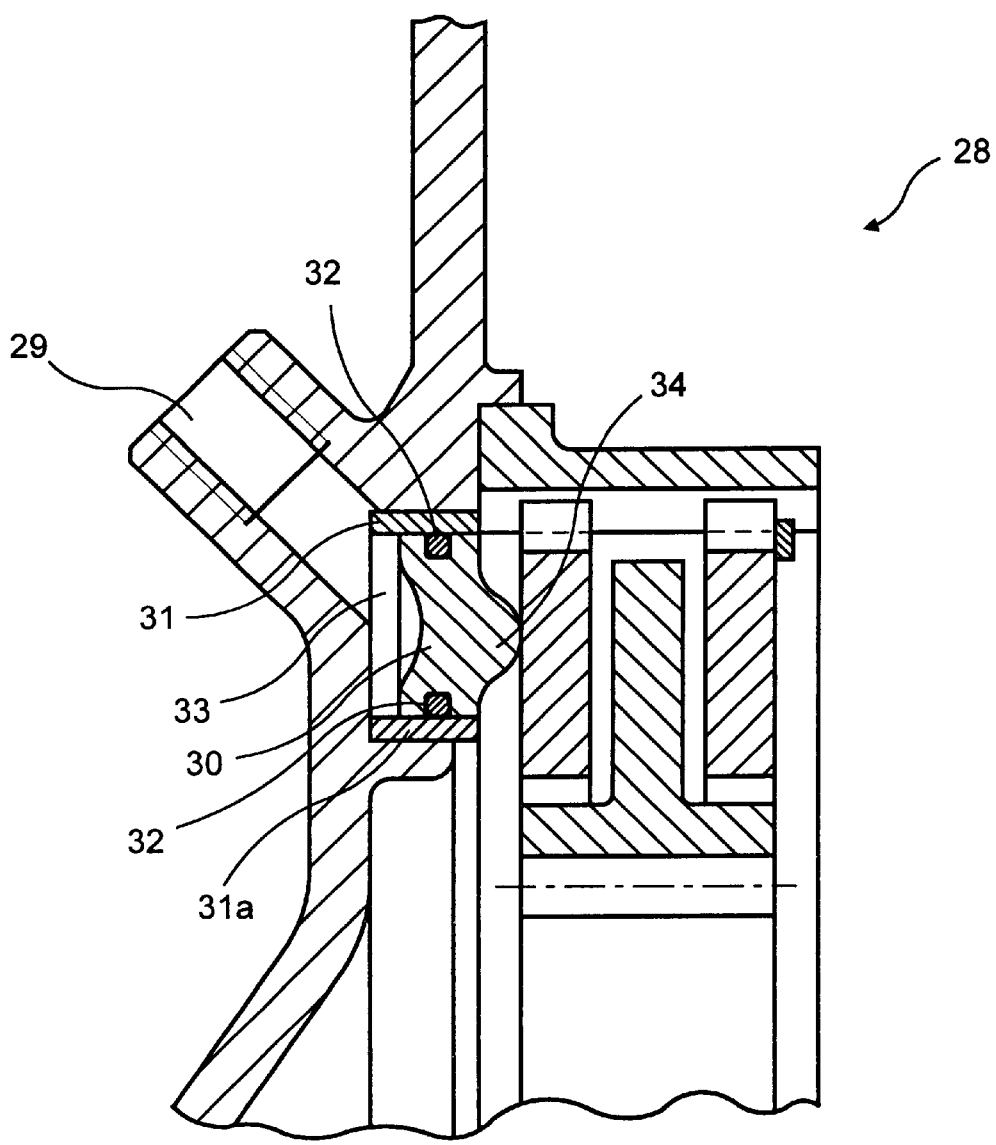
FIG. 2 shows an actuating element for the setting brake.

FIG. 2 shows an example of a hydraulic brake actuator 28 having an air vent 29, a hydraulic oil chamber 33, and a cylindrical piston 30. This cylindrical piston 30 is mounted between an outer and an inner guide ring 31, 31a in end shield 19 so that it can move in an axial direction, and is sealed by sealing rings 32. Guide rings 31, 31a are made of a wear-resistant material. This makes it possible to select any material for the end shield.

Cylindrical piston 30 has a rounded torus 34 that interacts with one of brake pads 24. The compressive force exerted by cylindrical piston 30 on one brake pad 24 causes brake disk 23 to be clamped between brake pads 24 due to the axial motion, since axial stop 35 prevents second brake pad 24 from moving out of the way. The linear contact between torus 34 and disk-shaped brake pad 24 preferably takes place along the line of gravity of the latter, thus ensuring that the brake pad is applied evenly and without being forced.

The mechanism according to the present invention operates as follows: crankshaft 2 drives planetary gear carrier 12 via sprocket wheel combination 3 and vibration isolator 8. The latter functions like a cross-recess coupling in combination with its four slots 10, which are arranged in pairs facing each other and are offset from one another by 90°, and with claws 11 of sprocket wheel combination 3 and planetary gear carrier 12 fitting into the slots with a limited amount of tangential clearance and a greater amount of radial clearance. This arrangement does not allow the transmission of radial or axial vibrations produced by free crankshaft end 2a to planetary gear carrier 12. The transmission path from planetary gear carrier 12 to sleeve 17a via one-way clutch 22 is therefore also free of radial and axial vibrations produced by crankshaft 2, which has a positive effect on the noise level and service life of all components of planetary transmission 1.

At a low engine speed, the application of hydraulic oil to cylindrical piston 30 in hydraulic oil chamber 33 presses brake pads 24 against brake disk 23 of floating ring gear 17 and against axial stop 35 of mounting device 25. This holds ring gear 17 in place above mounting device 25 on end shield 19 so that planet gears 15 rest on or roll off of ring gear 17. While rolling, planet gears 15 rotate around their bolts 13 and drive sun gear 16 in the rotational direction of planetary gear carrier 12. The mechanism thus gears up to a higher speed according to the ratio between the number of teeth in ring gear 17 and the number of teeth in sun gear 16.

As the engine speeds up from a certain speed, brake disk 23 and brake pads 24 disengage from one another. Because there is no torque support on ring gear 17, planetary gear carrier 12 engages with one-way clutch 22, thereby coupling sleeve 17a or belt pulley 21 with crankshaft 2 via vibration isolator 8 in a 1:1 ratio. Planetary transmission 1 now rotates with ring gear 17, planetary gear carrier 12, planet gears 15, and sun gear 16 as a single unit without performing any efficiency-reducing relative movements. Since belt pulley 21 is driven directly, the accessory assemblies are prevented from racing, since the rotational speed of belt pulley 21 equals the rotational speed of crankshaft 2. Because coupling with belt pulley 21 takes place via vibration isolator 8, the torque of crankshaft 2, but not its radial or axial vibrations, is transmitted to sleeve 17a with belt pulley 21. In both modes of operation, the drive mechanism is therefore free of wear- and noise-promoting vibrations of the crankshaft. Because it is positioned in the timing box, planetary transmission 1 is always well lubricated, which has a positive effect on its efficiency and service life.

What is claimed is:

1. A drive mechanism for accessory assemblies of an internal combustion engine comprising:

a housing;

a switchable planetary transmission positioned concentrically to the crankshaft, the planetary transmission including a planetary gear carrier, a plurality of planet gears, a ring gear and a sun gear, the sun gear being connected to a belt pulley, positioned in the housing and connectable to the planetary gear carrier via a one-way clutch;

a crankshaft connected to the planetary gear carrier;

a braking device for locking the ring gear against the housing; and a vibration isolator for connecting the planetary gear carrier to the crankshaft.

2. A drive mechanism for accessory assemblies of an internal combustion engine comprising:

a housing;

a switchable planetary transmission positioned concentrically to the crankshaft, the planetary transmission including a planetary gear carrier, a plurality of planet gears, a ring gear and a sun gear, the sun gear being connected to a belt pulley, positioned in the housing and connectable to the planetary gear carrier via a one-way clutch;

a crankshaft connected to the planetary gear carrier;

a braking device for locking the ring gear against the housing;

a vibration isolator for connecting the planetary gear carrier to the crankshaft; and a flange nonrotatably connected to the crankshaft;

wherein the planetary gear carrier and the flange have an equal number of axial claws and the vibration isolator has a plurality of radial slots, the claws engaging the radial slots so as to center the vibration isolator.

3. The drive mechanism as recited in claim 1 wherein the vibration isolator is made of an elastic material.

4. The drive mechanism as recited in claim 2 wherein the vibration isolator is made of an inelastic material and the claws have a limited amount of tangential clearance and a radial clearance in the slots greater than the limited amount of tangential clearance.

5. The drive mechanism as recited in claim 4 wherein the slots include four slots evenly distributed around a circumference of the vibration isolator, and wherein the flange has a first pair of opposing claws and the planetary gear carrier has a second pair of opposing claws, the first pair of claims being offset by 90° from the second pair of claws.

6. A drive mechanism for accessory assemblies of an internal combustion engine comprising:

a housing;

a switchable planetary transmission positioned concentrically to the crankshaft, the planetary transmission including a planetary gear carrier, a plurality of planet gears, a ring gear and a sun gear, the sun gear being connected to a belt pulley, positioned in the housing and connectable to the planetary gear carrier via a one-way clutch;

a crankshaft connected to the planetary gear carrie;

a braking device for locking the ring gear against the housing; and a vibration isolator for connecting the planetary gear carrier to the crankshaft;

wherein the braking device includes a brake disk arranged on the ring gear, the ring gear being movably mounted on the planet gears.

7. The drive mechanism as recited in claim 6 wherein the brake disk includes a radial flange arranged on a circumference of the ring gear, the flange and the ring gear being integral.

8. The drive mechanism as recited in claim 7 wherein the radial flange is arranged at a center of an axial length of the ring gear.

9. The drive mechanism as recited in claim 6 wherein the braking device further includes disk-shaped brake pads on both sides of the brake disk, the brake pads being mounted in a mounting device surrounding the brake pads and connected to the housing, the brake pads being movable together with the brake disk against an axial stop of the mounting device.

10. The drive mechanism as recited in claim 9 further comprising a cylindrical piston actuated by oil pressure for applying an axial pressure to the brake pads and brake disks, the piston being sealingly guided in an outer and an inner guide ring in the housing.

11. The drive mechanism as recited in claim 10 wherein the cylindrical piston has a rounded torus for apply pressure to the brake pads and the brake disk.

12. The drive mechanism as recited in claim 1 further comprising an electronic controller for smoothly switching the planetary transmission on and off and/or for providing switching-optimized control of at least one of an accessory assembly torques and engine torque.

13. The drive mechanism as recited in claim 1 wherein the housing includes a timing box, the planetary transmission being positioned in the timing box and lubricated by motor oil.

14. The drive mechanism as recited in claim 13 wherein the planetary transmission is mounted in a timing box cover of the timing box.

15. The drive mechanism as recited in claim 1 wherein the housing includes an end shield.

* * * * *